(12) United States Patent
Zenere et al.

(10) Patent No.: US 9,446,557 B2
(45) Date of Patent: Sep. 20, 2016

(54) METHOD FOR PRODUCING A THREE-DIMENSIONAL OBJECT AND STEREOLITHOGRAPHY MACHINE EMPLOYING SAID METHOD

(75) Inventors: Sergio Zenere, Carre (IT); Roberto Fortunato, Torrebelvicino (IT)

(73) Assignee: DWS S.R.L., Zane (IT)

( * ) Notice: Subject to any disclaimer, the term of this patent is extended or adjusted under 35 U.S.C. 154(b) by 617 days.

(21) Appl. No.: 13/992,487

(22) PCT Filed: Jan. 18, 2012

(86) PCT No.: PCT/IB2012/000059
§ 371 (c)(1),
(2), (4) Date: Jun. 7, 2013

(87) PCT Pub. No.: WO2012/098451
PCT Pub. Date: Jul. 26, 2012

(65) Prior Publication Data
US 2013/0249146 A1      Sep. 26, 2013

(30) Foreign Application Priority Data
Jan. 18, 2011 (IT) .................. VI2011A0004

(51) Int. Cl.
*B29C 35/08* (2006.01)
*B29C 67/00* (2006.01)
(52) U.S. Cl.
CPC ....... *B29C 67/0066* (2013.01); *B29C 67/0088* (2013.01)
(58) Field of Classification Search
CPC ................ B29C 67/0066; B29C 67/0088
See application file for complete search history.

(56) References Cited

U.S. PATENT DOCUMENTS

2008/0174050 A1   7/2008  Kikuchi
2009/0020901 A1   1/2009  Schillen et al.
2010/0262272 A1  10/2010  Shkolnik et al.

OTHER PUBLICATIONS

Huang et al., "On-line force monitoring of platform ascending rapid prototyping system", Journal of Materials Processing Technology 159 (2005), May 15, 2004, p. 257-264.*
International Search Report and Written Opinion dated May 14, 2012, issued in PCT Application No. PCT/IB2012/000059, filed Jan. 18, 2012.

* cited by examiner

*Primary Examiner* — Galen Hauth
(74) *Attorney, Agent, or Firm* — Husch Blackwell LLp

(57) ABSTRACT

Method for producing a three-dimensional object in layers by way of a stereolithography machine (1) including a container (2) suited to contain a liquid substance (3), structure (5) suited to emit predefined radiation (4) suited to selectively solidify a layer (6) of the liquid substance (3) adjacent to the bottom (2*a*) of the container (2), and an actuator (8) suited to move the solidified layer (6*a*) with respect to the bottom (2*a*). The method includes selectively solidifying the liquid layer (6); separating the solidified layer (6*a*) from the bottom (2*a*) through a movement (11) suited to move them away from each other, including a plurality of shifts (12, 12*a*, 12*b*, 12*c*) for corresponding predefined lengths, spaced by corresponding intermediate stops (14, 14*a*, 14*b*) for corresponding predefined time intervals (15, 15*a*, 15*b*). The intermediate stops are carried out before the solidified layer has become completely detached from the bottom.

11 Claims, 2 Drawing Sheets

METHOD FOR PRODUCING A THREE-DIMENSIONAL OBJECT AND STEREOLITHOGRAPHY MACHINE EMPLOYING SAID METHOD

BACKGROUND OF THE INVENTION

1. Field of the Invention

The present invention concerns a stereolithography method for the production of a three-dimensional object, as well as a stereolithography machine using said method.

2. Present State of the Art

As is known, a stereolithography machine comprises a container for a liquid substance suited to be solidified through exposure to predefined radiation, typically light radiation.

The above mentioned radiation is produced by radiation emitting means suited to selectively irradiate a layer of the liquid substance having a predefined thickness and arranged adjacent to the bottom of the container, so as to solidify it.

The machine also comprises a modelling plate facing the bottom of the container and provided with a supporting surface for the three-dimensional object to be made.

The above mentioned modelling plate is associated with moving means that are suited to move it according to a direction perpendicular to the bottom of the container.

In order to produce a three-dimensional object using a machine of the type described above, the shape of the object is schematized as a sequence of layers having a predefined thickness.

According to the production method, the modelling plate is arranged with the supporting surface immersed in the liquid substance, at a distance from the bottom of the container that is equal to the thickness of the first layer of the object.

A layer of liquid substance is thus formed that is adjacent to the bottom of the container and that is selectively irradiated by the emitting means in the parts corresponding to the surface area of the first layer, so as to form a corresponding solidified layer that adheres to the supporting surface of the modelling plate.

Successively, the modelling plate is first moved away from the bottom of the container, so as to separate the solidified layer from the bottom itself and thus allow the liquid substance to flow back under the modelling plate and the liquid layer necessary to form a successive layer of the object to be consequently restored.

Successively, the modelling plate is moved near the bottom of the container, so as to arrange it at a distance from the bottom that corresponds to its distance as it was during the formation of the first layer, increased by the thickness of the successive layer.

The new layer of the object is thus formed analogously to the previous one and this process is repeated until all the layers forming the object have been produced.

Document US 2010/0262272 discloses a method similar to the one described above, except that the layers are formed and solidified between the modeling plate and a solidification substrate located above it, instead of using the bottom of the container.

The method described above poses the drawback that the detachment of the solidified layer from the bottom of the container while the plate is being moved away generates a certain resistance.

This resistance to detachment is mainly due to the suction effect caused by the contact between the solidified layer and the bottom of the container and partly to the adhesion of the solidified layer to the bottom of the container.

Said resistance to detachment produces traction forces on the three-dimensional object being formed and on the bottom of the container, whose amount mainly depends on the speed with which the plate is moved away, on the surface area of the solidified layer and on the physical properties of the liquid substance.

Due to the above mentioned traction forces, it is necessary to limit the said speed of the modelling plate, in order to avoid breaking the three-dimensional object that is being formed.

Consequently, another drawback lies in that the time necessary for the formation of each layer increases, thus increasing also the total time necessary for the production of the object.

A further drawback lies in that the traction forces generate fatigue stress on the bottom of the container, which over time causes the latter to break down.

This involves the need to periodically replace the container, with the inconvenience of having to stop production and bear the replacement costs.

According to a known stereolithography method adopted in the attempt to limit the resistance to detachment described above, the movement of the plate away from the bottom of the container is controlled in such a way that the traction forces acting on the object and on the bottom are limited to a maximum predefined value.

According to the above mentioned method, it is necessary to determine the traction forces, which requires the use of a suitable sensor, and this makes the stereolithography machine more complex and increases its costs.

According to a variant application of the above mentioned method, the traction forces are determined using a numerical calculation procedure.

Even if this variant makes it possible to avoid using a sensor, it however poses the drawback of requiring a complex processing software for calculating the forces.

Furthermore, said calculation may not correspond to the actual value of the forces, with the inconvenience of reducing the reliability of the system.

SUMMARY OF THE INVENTION

The present invention intends to overcome all the drawbacks of the known art as outlined above.

In particular, it is a first object of the invention to develop a method for producing a three-dimensional object in layers using a stereolithography machine, which makes it possible to reduce the traction stress between each solidified layer and the bottom of the container while they are separated from each other.

It is another object of the invention that the above method makes it possible to reduce the extent of the movement of the solidified layer which is necessary to detach it from the bottom of the container to a lower value compared to the value obtainable with the known methods.

It is another object of the invention to develop the method mentioned above so that it can be easily applied to stereolithography machines of known type.

The above mentioned objects are achieved by a method for producing a three-dimensional object implemented according to the main claim.

Further characteristics and details of the method that is the subject of the invention are described in the corresponding dependent claims.

The above mentioned objects are also achieved by a stereolithography machine constructed according to claim 10.

Advantageously, the reduced resistance to detachment makes it possible to limit the breakages of the object being formed compared to the known methods though maintaining the same geometry of the object.

Still advantageously, said reduced resistance makes it possible to limit the stress on the container and thus to increase its duration.

Furthermore, advantageously, the reduced stress to which the layers of the object are subjected makes it possible to obtain objects whose cross section is larger than that of the objects that can be obtained with the known methods, maintaining the same detachment speed and the same physical properties of the liquid substance used.

Still advantageously, the reduction of the movement of the modelling plate makes it possible to reduce the time necessary for building each layer.

BRIEF DESCRIPTION OF THE DRAWINGS

The said objects and advantages, together with others which will be highlighted below, are illustrated in the description of some preferred embodiments of the invention which are provided by way of non-limiting examples with reference to the attached drawings, wherein.

DETAILED DESCRIPTION OF THE PREFERRED EMBODIMENTS

Figure 1:
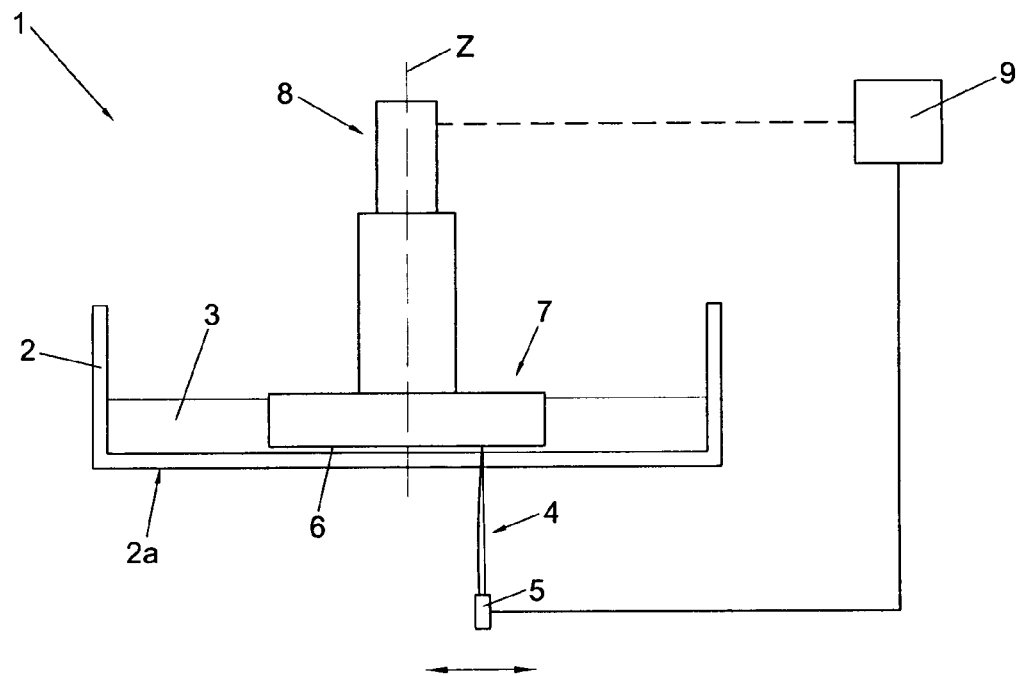
FIG. 1 shows a stereolithography machine according to the invention.

The method for producing a three-dimensional object that is the subject of the invention is described with reference to a stereolithography machine that is indicated as a whole by 1 in FIG. 1.

The above mentioned machine 1 comprises a container 2 suited to contain a liquid substance 3 suited to be solidified through exposure to predefined radiation 4.

Figure 2:
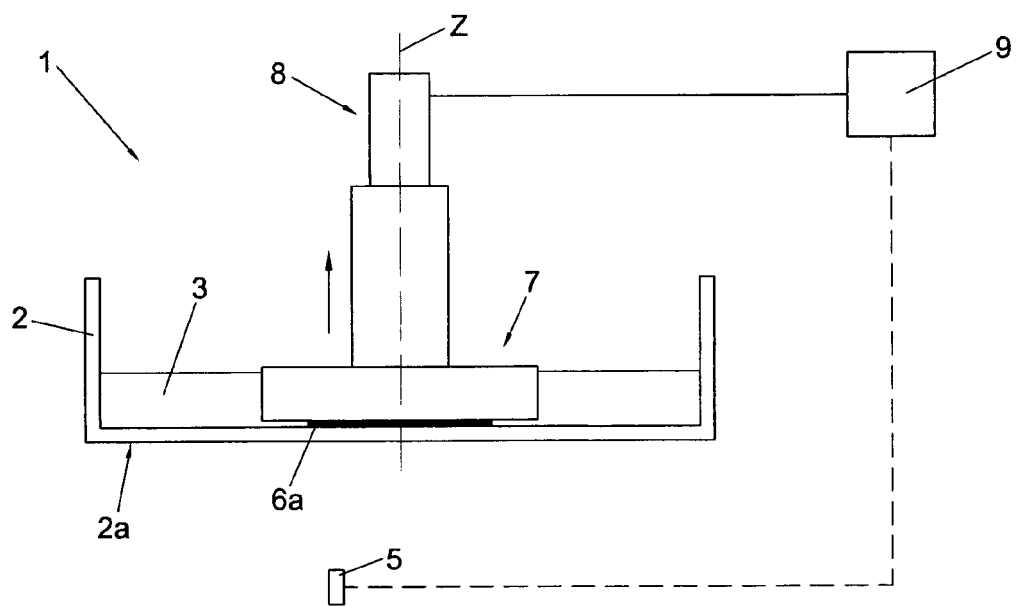
FIG. 2 shows the stereolithography machine shown in FIG. 1 in a different operating configuration.

The machine 1 also comprises means 5 suited to emit said predefined radiation 4, capable of selectively irradiating a layer 6 of the liquid substance 3 having a predefined thickness and arranged adjacent to the bottom 2a of the container 2, so as to form a corresponding solidified layer 6a of the object, as schematically shown in FIG. 2.

Preferably but not necessarily the above mentioned predefined radiation 4 is a laser beam that is selectively directed towards the areas corresponding to the volume of the object to be produced through said emitting means 5.

The machine 1 comprises also actuator means 8 suited to move the solidified layer 6a with respect to the bottom 2a of the container 2 at least according to a movement direction Z that is perpendicular to the bottom 2a.

Said actuator means 8 preferably comprise a modelling plate 7 provided with a supporting surface 7a for said solidified layer 6a and facing the bottom 2a of the container 2.

The stereolithography machine 1 also comprises a logic control unit 9, operatively connected to the emitting means 5 and the actuator means 8 and configured so as to implement a method according to the invention, as described below.

According to the method of the invention, first of all the layer 6 of liquid substance 3 must be irradiated, as described above.

Successively, the actuator means 8 separate the solidified layer 6a obtained in this way from the bottom 2a of the container 2 through a separation movement 11 having a predefined extent and intended to move the solidified layer 6a and the bottom 2a away from each other.

Figure 3:
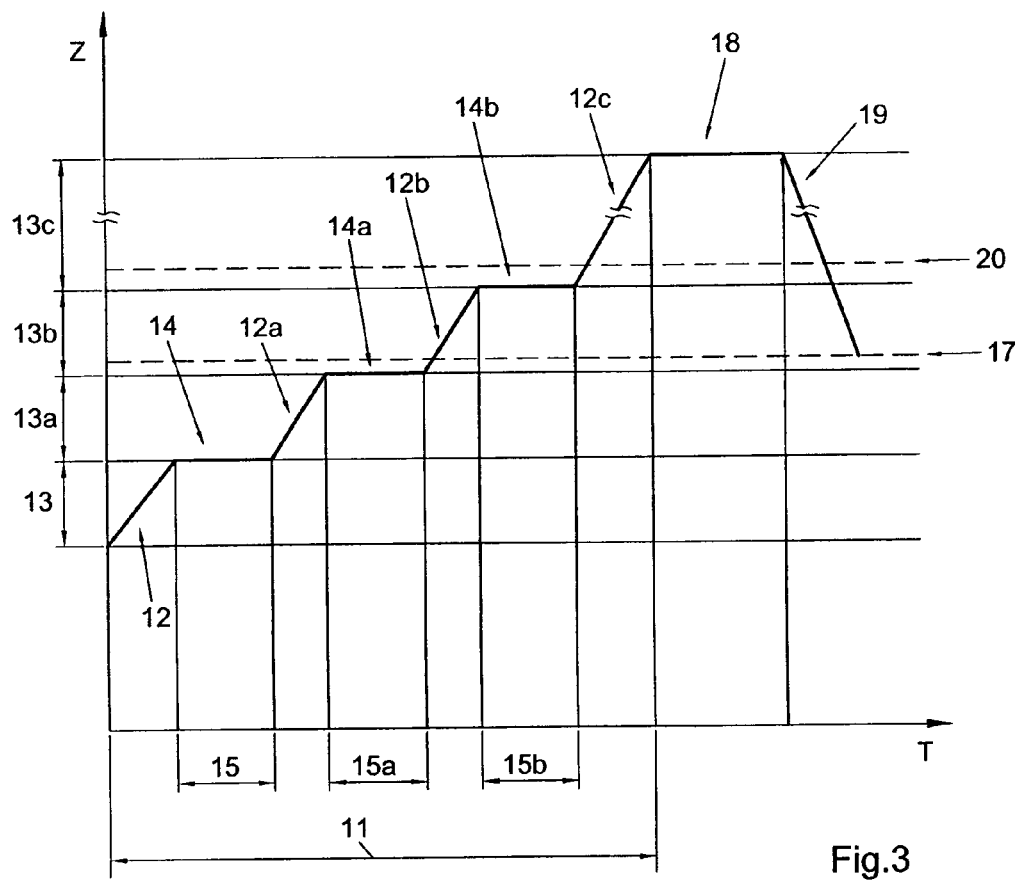
FIG. 3 shows a schematic view of the movement of a solidified layer during application of the method that is the subject of the invention.

The diagram shown in FIG. 3 illustrates by way of example the movement of the solidified layer 6a along the movement direction Z according to the time T.

During an initial part of the above mentioned separation movement 11, the solidified layer 6a remains adherent to the bottom 2a owing to the resistance to detachment described above.

During the above mentioned initial part of the movement 11, the solidified layer 6a and the bottom 2a are subjected to mutual traction stress that causes a certain elastic deformation of the same.

The complete separation of the solidified layer 6a from the bottom 2a takes place exclusively at the level of the final position 20 of the above mentioned initial part of the movement 11, when the solidified layer 6a and the bottom 2a return to the respective non deformed positions.

In particular, according to the method of the invention the above mentioned separation movement 11 comprises a plurality of separation shifts 12, 12a, 12b, 12c having respective predefined lengths 13, 13a, 13b, 13c.

The above mentioned separation shifts 12, 12a, 12b, 12c are interrupted by intermediate stops 14, 14a, 14b lasting corresponding predefined time intervals 15, 15a, 15b, which occur before the solidified layer 6a has been completely separated from the bottom 2a of the container 2.

Advantageously, during each intermediate stop, the combined effect of the traction and elastic deformation of the solidified layer 6a and of the bottom 2a cause them to partially separate at the level of the perimeter of the solidified layer 6a, thus allowing the penetration of the liquid substance 3 between the solidified layer 6a and the bottom 2a.

The above mentioned penetration reduces the surface area of the solidified layer 6a that adheres to the bottom 2a, in such a way as to reduce the traction stress during the successive separation shift 12, 12a, 12b, 12c.

Therefore, the above mentioned intermediate stops 14, 14a, 14b have the effect of limiting the traction stress on the solidified layer 6a and on the bottom 2a of the container 2 to lower values than those that would result if the separation movement 11 were a continuous movement, thus achieving one of the objects of the invention.

Furthermore, to advantage, the intermittent separation movement 11 ensures more gradual penetration of the liquid substance 3 between the solidified layer 6a and the bottom 2a, avoiding the sudden detachment movements that are typical of the stereolithography machines of known type and that may cause the object being formed to break.

Still advantageously, the stop intervals 15, 15a, 15b allow the inner stress to be redistributed in the solidified layer 6a and in the bottom 2a of the container 2, further limiting the harmful effects of said stress.

Consequently, to advantage, the method of the invention makes it possible to reduce the number of production rejects compared to that obtained with the known methods.

Furthermore, to advantage, the reduced stress obtained with the method of the invention makes it possible to produce objects having larger cross section than those obtainable with the known methods using an equivalent stereolithography machine.

Analogously, the fatigue stress on the bottom 2a of the container 2 is reduced, advantageously increasing the duration of the latter.

The intermediate stops 14, 14a, 14b and the consequent penetration of the liquid substance 3 bring the further advantage of accelerating the separation of the solidified layer 6a from the bottom 2a, making it possible to achieve the object of reducing the predefined extent of the separation movement 11.

It should be observed that all the above mentioned advantages are obtained thanks to the intermediate stops 14, 14a, 14b, with no need to modify the speed of the actuator means 8.

Therefore, the method of the invention can be used in a stereolithography machine of known type with a simple modification of the software of the logic control unit 9, with no need to make mechanical modifications or to add complex systems for adjusting the speed of the actuator means 8, thus achieving a further object of the invention.

Preferably, each intermediate stop 14, 14a, 14b takes place when the solidified layer 6a is still at least partially immersed in the liquid substance 3.

Advantageously, this makes it possible to use the pressure of the liquid substance 3 to force it to penetrate between the solidified layer 6a and the bottom 2a, thus accelerating the separation process.

Preferably, the predefined extent of the separation movement 11 is such that the solidified layer 6a never emerges completely from the liquid substance 3.

This advantageously makes it possible to avoid the formation of air bubbles between the solidified layer 6a and the liquid substance 3, which may affect the correct solidification of the successive layer.

Obviously, the number of the separation shifts 12, 12a, 12b, 12c and of the intermediate stops 14, 14a, 14b, as well as the corresponding predefined lengths 13, 13a, 13b, 13c and the time intervals 15, 15a, 15b can be defined in any way.

For example, the predefined lengths 13, 13a, 13b, 13c can be such that their sum, corresponding to the extent of the separation movement 11, exceeds the thickness of the successive layer of the object.

After the separation movement 11 and before irradiating the successive layer, an approach movement 19 is performed in order to bring the solidified layer 6a to a position 17 such that the distance from the bottom 2a is equal to the thickness of the successive layer to be solidified, as indicated in FIG. 3.

Preferably but not necessarily, between the separation movement 11 and the approach movement 19 there is a pause 18, intended to allow the liquid substance 3 to flow back between the solidified layer 6a and the bottom 2a, so as to obtain the complete restoration of the liquid layer.

Preferably, the number of the separation shifts 12, 12a, 12b, 12c and of the intermediate stops 14, 14a, 14b, as well as the corresponding predefined lengths 13, 13a, 13b, 13c and the time intervals 15, 15a, 15b are such that the part of the separation movement 11 necessary to obtain the complete separation of the solidified layer 6a from the bottom 2a does not exceed the thickness of the successive layer of the object.

Advantageously, this makes it possible to avoid said approach movement 19 and thus reduces the extent of the overall movement of the solidified layer 6a.

Figure 4:
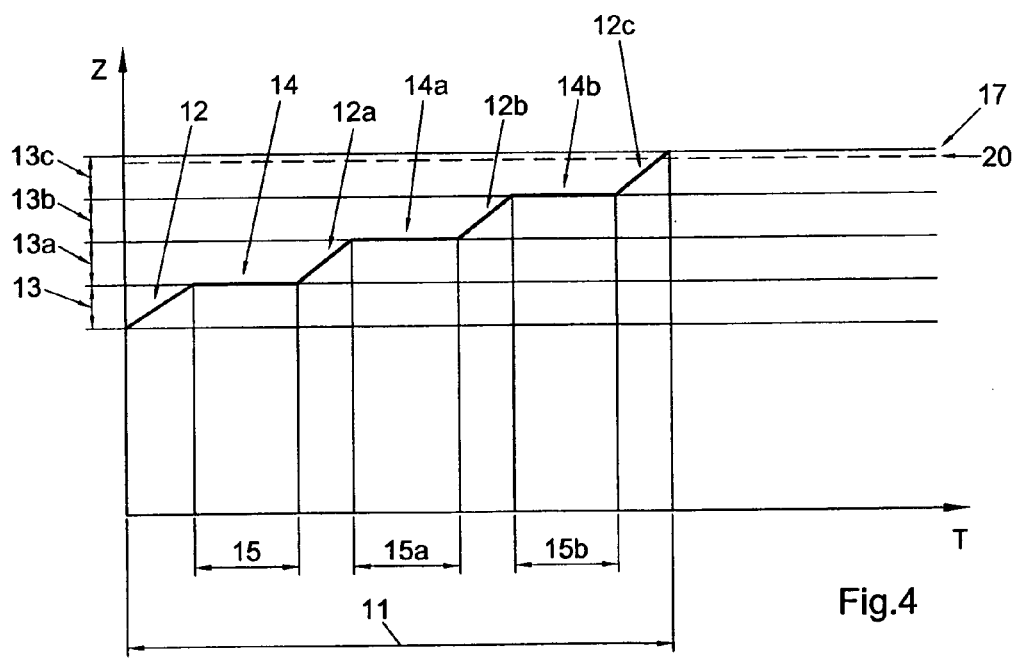
FIG. 4 shows a schematic view of the movement of a solidified layer during application of a variant implementation of the method that is the subject of the invention.

In fact, as in this case the solidified layer 6a comes off before reaching the position 17 corresponding to the successive layer, the solidified layer 6a can be arranged in the above mentioned position 17 through the last separation shift 12c, as shown in FIG. 4.

With the other conditions remaining the same, the predefined extent of the separation movement 11 can be reduced, for example, by means of longer time intervals 15, 15a, 15b and/or more intermediate stops 14, 14a, 14b.

Preferably, the determination of the value of one or more parameters selected among the lengths of the separation shifts 12, 12a, 12b, 12c, the number of the intermediate stops 14, 14a, 14b and the corresponding time intervals 15, 15a, 15b takes place before starting the separation movement 11.

In this way, the above mentioned selected parameters are independent of any feedback actions of the actuator means 8, avoiding possible delays in the intermediate stops, to the advantage of the precision and reliability of the method.

Preferably but not necessarily the values of the above mentioned selected parameters are calculated according to the surface area of the layer 6a to be solidified.

Advantageously, the above mentioned calculation makes it possible to optimize the separation movement 11 for each layer, so as to minimize the extent of the separation movement 11 and consequently its duration.

In particular, according to the method a curve should be defined to express each one of the above mentioned selected parameters as a function of the surface area of the layer.

The above mentioned predefined curve can be stored in the logic control unit 9 of the stereolithography machine 1, in such a way as to simplify the above mentioned calculation.

Preferably, the values of the selected parameters are calculated as a function of the ratio between the above mentioned surface area of the layer 6a to be solidified and its perimeter, representing the shape of the layer itself.

This, advantageously, makes it possible to include in the calculation the relationship existing between the penetration speed of the liquid substance 3 between the solidified layer 6a and the bottom 2a and the perimeter of the solidified layer 6a, given the same surface area.

In particular, among all the possible shapes having the same surface area, a circular layer has the minimum perimeter, and so gives the liquid substance 3 fewer chances to penetrate between the solidified layer 6a and the bottom 2a, thus making the detachment process slower.

Vice versa, a layer featuring a longer perimeter compared to a circular layer having the same surface area gives the liquid substance 3 more chances to penetrate and thus favours the detachment process more than the previous circular layer.

Consequently, the number of intermediate stops 14, 14a, 14b and/or the corresponding time intervals 15, 15a, 15b can be reduced as the shape of the layer deviates from the circular shape, while the opposite situation occurs for the lengths of the separation shifts 12, 12a, 12b, 12c.

A possible formula for the above mentioned shape ratio is the following:

$$R = 4\pi A/P^2$$

where R stands for the shape ratio, A for the surface area of the layer and P for its perimeter.

It is evident that the above mentioned shape ratio assumes a maximum value equal to 1 when the layer has a circular shape and progressively decreases towards 0 (zero) as the layer becomes more flattened.

According to a variant embodiment of the invention, the calculation of the above mentioned selected parameters can be made taking in consideration a further shape parameter having a simplified formula compared to the previous one.

Preferably, the calculation of the above mentioned parameter requires that the surface area of the layer 6a to be solidified be divided into a plurality of cells having predefined dimensions, each one of which is assigned a weight that is proportional to the number of cells adjacent to it.

The weights of the cells are summed together in order to obtain the above mentioned shape parameter, which is used to calculate the values of the selected parameters in replacement of said shape ratio.

Obviously, the calculation of the selected parameters can be carried out even combining the above mentioned methods, that is, using the surface area, the shape ratio and/or the shape parameter in combination with each other.

Preferably, if the solidified layer 6a is made up of several separated portions, in the calculation of the selected parameters only the surface areas, the shape ratios and/or the shape parameters are considered that correspond to the portions whose surface area has a predefined value, or only to the portion having the largest surface area.

Advantageously, this makes it possible to minimize the separation time of the solidified layer 6a and/or the extent of the corresponding movement, without increasing the risk of breaking the object being formed.

In fact, it should be considered that each one of said portions becomes detached from the bottom 2a in a manner that is essentially independent of the other portions, and that, therefore, it will be possible to define the selected parameters only according to the portions for which detachment is more critical, meaning the portions, or portion, with larger surface area.

It is also evident that in further variants of the method of the invention the lengths of the separation shifts 12, 12a, 12b, 12c, the number of the intermediate stops 14, 14a, 14b and/or the corresponding time intervals 15, 15a, 15b can be determined once and for all before starting the construction of the model and be maintained unchanged for all of the layers.

In any case, preferably but not necessarily the lengths of the separation shifts 12, 12a, 12b, 12c are defined so as to be the same, for the sake of calculation simplicity.

Furthermore, the value of the above mentioned selected parameters can be defined according to other parameters in addition to those described above, for example the viscosity and density of the liquid substance 3, the movement speed of the actuator means 8, the maximum depth of the liquid substance 3 present in the container 2, the mechanical resistance of the bottom 2a and of the solidified layers 6a, etc.

By way of example, for a stereolithography machine 1 of the known type, a number of intermediate stops included between one and twenty, a length of each separation shift 12, 12a, 12b, 12c included between 5 and 200 microns and a duration of the time intervals 15, 15a, 15b included between 0.01 seconds and 1 second can be suitable for most applications.

According to an example of application of the method described above, a numerical representation of each layer of the object to be produced is processed and supplied to the logic control unit 9, which controls the actuator means 8 and the emitting means 5 so as to arrange the modelling plate 7 at a suitable distance from the bottom 2a of the container 2 and, successively, form each solidified layer 6a according to the description provided above.

Successively, the logic control unit 9 determines the number of intermediate stops 14, 14a, 14b, their duration 15, 15a, 15b, as well as the predefined lengths 13, 13a, 13b, 13c of the separation shifts 12, 12a, 12b, 12c consequently activates the actuator means 8.

During the separation movement, once having reached the point 20, the solidified layer 6a comes off the bottom 2a.

The separation movement 11 is completed and if necessary a successive approach movement 19 is carried out, so as to arrange the modelling plate 7 in a suitable position for the solidification of the successive layer.

The above shows that the method for producing a three-dimensional object and the stereolithography machine of the invention described above achieve all the set objects.

In particular, the intermittent separation movement makes it possible to reduce the mutual traction stress on the solidified layer and on the bottom of the container before detachment.

Furthermore, the progressive penetration of the liquid substance between the solidified layer and the bottom of the container makes it possible to reduce the extent of the movement of the solidified layer necessary to cause it to come off the bottom of the container.

Furthermore, the method of the invention is based on an intermittent movement that is easy to apply to stereolithography machines of known type through simple modifications of their software.

Upon implementation, the method and the machine that are the subjects of the invention may be subjected to further changes that, even though not described herein and not illustrated in the drawings, must all be considered protected by the present patent, provided that they fall within the scope of the following claims.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A method for producing a three-dimensional object in layers by means of a stereolithography machine of the type comprising:
  a container for containing a liquid substance suited to be solidified through exposure to predefined radiation;
  means for emitting said predefined radiation, suited to selectively irradiate a layer of said liquid substance having a predefined thickness and arranged adjacent to the bottom of said container in order to solidify it;
  actuator means suited to move said solidified layer with respect to said bottom at least according to a direction perpendicular to said bottom;
  said method comprising the following operations:
  selectively irradiating said layer of liquid substance in such a way as to obtain said solidified layer;
  separating said solidified layer from said bottom through a mutual separation movement having a predefined extent, wherein said separation movement comprises a plurality of separation shifts for corresponding predefined lengths, spaced by corresponding intermediate stops for corresponding predefined time intervals, said intermediate stops being carried out before said solidified layer has become completely detached from said bottom.

2. The method according to claim 1, wherein each one of said intermediate stops takes place when said solidified layer is at least partially immersed in said liquid substance.

3. The method according to claim 1, wherein said lengths of said separation shifts, the number of said intermediate stops and the duration of said time intervals are defined so that the predefined extent of said separation movement necessary to obtain said complete separation of said solidified layer from said bottom does not exceed the thickness of the successive layer of said object.

4. The method according to claim 1, wherein the determination of the value of at least one parameter selected among the lengths of said separation shifts, the number of intermediate stops and the corresponding time intervals takes place before starting said separation movement.

5. The method according to claim 4, wherein the values of said selected parameters are calculated as follows: for each of said selected parameters, defining a corresponding reference curve as a function of the surface area of the layer to be solidified such that the values of the functions evaluated for any given surface area correspond to the values for the selected parameters and that allow minimization of the extent of the separation movement for that surface area, attributing to said selected parameters the values of the respective reference curves evaluated at the actual surface area of the layer to be solidified.

6. The method according to claim 5, wherein the calculation of the values of said selected parameters comprise: defining a shape function; calculating the ratio between the surface area and the layer to be solidified and the perimeter of said layer to be solidified; and multiplying the values of at least one of said selected parameters by the value of said shape function evaluated at said ratio.

7. The method according to claim 5, wherein the calculation of the values of said shape parameters comprises the following operations:
defining a shape function;
dividing the surface area of the layer to be solidified into a plurality of cells;
assigning each cell a weight proportional to the number of cells adjacent to said cell;
summing up said weights in order to obtain a shape parameter; and
multiplying the values of at least one of said selected parameters by the value of the shape function evaluated at said shape parameter.

8. The method according to claim 1, wherein said lengths of said separation shifts are equal to each other.

9. The method according to claim 1, wherein said actuator means comprise a modelling plate provided with a supporting surface for said solidified layer facing the bottom of said container.

10. A stereolithography machine comprising:
a container for containing a liquid substance suited to be solidified through exposure to predefined radiation;
means for emitting said predefined radiation, suited to selectively irradiate a layer of said liquid substance having a predefined thickness and arranged adjacent to the bottom of said container in order to solidify it;
actuator means suited for moving said solidified layer with respect to said bottom according to a direction perpendicular to said bottom; and
a logic control unit operatively connected to said emitting means and to said actuator means, the logic control unit activates the actuator means intermittently, so that, for each solidified layer, the solidified layer is moved by plurality of separation shifts for corresponding predefined lengths, spaced by corresponding intermediate stops for corresponding predefined time intervals.

11. The method according to claim 1 wherein:
said separation movement comprises between 1 and 20 of said intermediate stops;
said predefined lengths of each of said separation shifts are included between 5 and 200 microns; and
the duration of said time intervals is included between 0.01 seconds and 1 second.

* * * * *